May 27, 1958  D. E. DAHLE  2,836,228
FOAM CUSHION
Filed June 15, 1956  2 Sheets-Sheet 1

Inventor
Donald E. Dahle
by W. Bartlett Jones,
Attorney

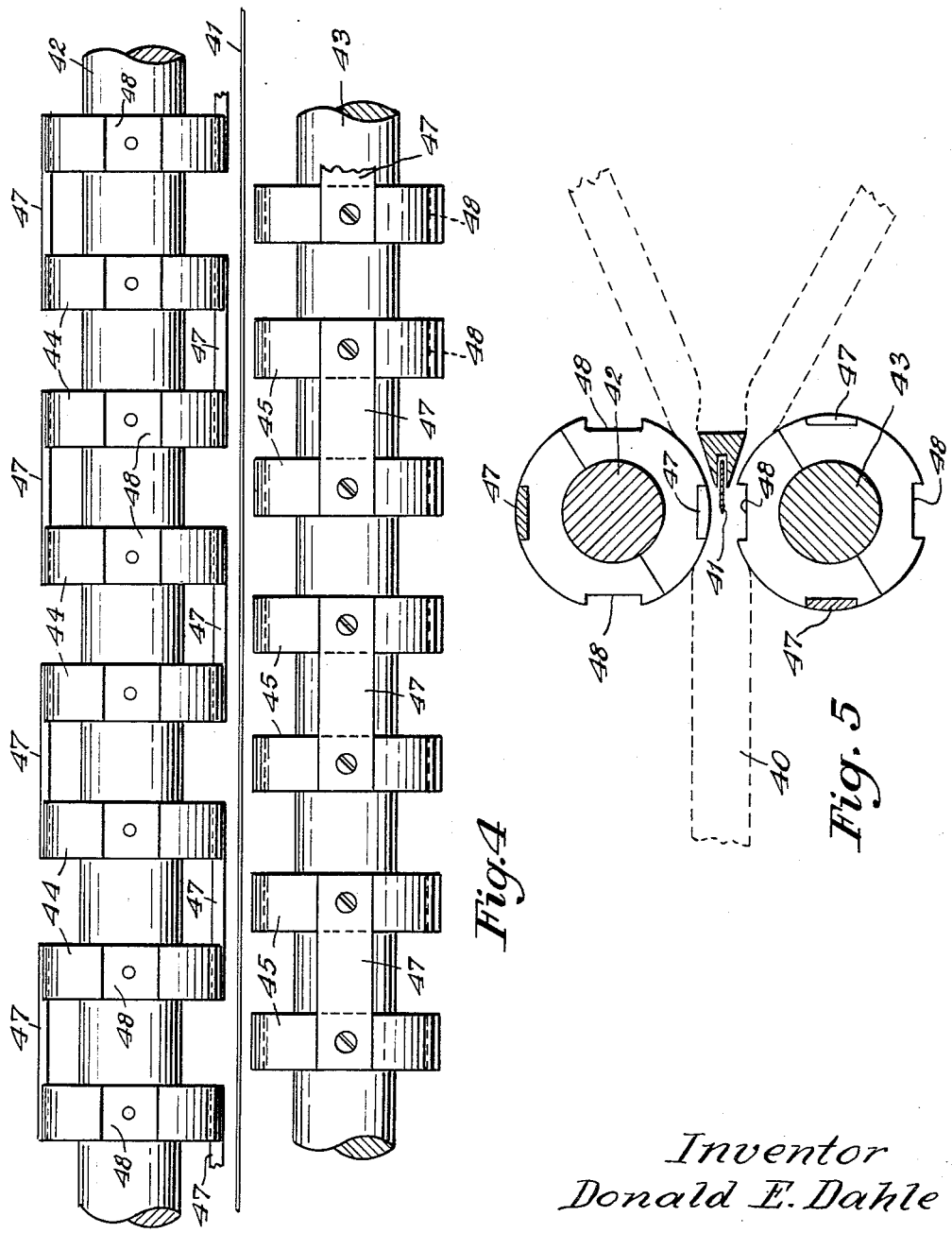

United States Patent Office 2,836,228
Patented May 27, 1958

2,836,228
FOAM CUSHION

Donald E. Dahle, High Point, N. C., assignor to Wood Conversion Company, St. Paul, Minn., a corporation of Delaware Application June 15, 1956, Serial No. 591,636

8 Claims. (Cl. 155—179)

The present invention relates generally to cushioning material, and in particular to cushions embodying foamed elastomers.

Foamed elastomers vary in resistance to compression according to the chemical constitution of the elastomer and the physical formation of the foam. Natural rubber latex and many synthetic latices produce finished foams which are highly compressible and elastic. Some are suitable for cushions when used in block form. Others have so little resistance to compression that they are unsuitable for use as cushions. Other types of elastomers are too rigid for use in block form with the result that blocks thereof are variously hollowed or cored, as, for example, in many foam mattresses on the market today. In many instances, the coring is effected in casting the foam. In so casting cored foams complicated molds and molding operations are involved.

The present invention is especially applicable to those foams which have extremely high resistance to compression, yet adequate resilience to return from compressed condition substantially to the original and normal uncompressed form, and it is also applicable to those foams which are not readily cast as cored forms. In addition, the present invention obviates the necessity for the use of complicated molds and molding operations to produce the desired effect of cored forms. Among the foamed elastomers to which the present invention is especially suitable is polyurethane.

It is the general object of the present invention to form suitably resilient cushioning material from foamed elastomers which in block form are unsuitable for cushioning material.

It is a particular object of the invention to provide a cored cushion of foam material in which the core openings are opposing cut faces of two layers of foam.

It is another object of the invention to provide a foam cushion having a variable and controllable resistance to compression resulting from the design of the cores.

Another object of the invention is to provide a cushion having at least two kinds of foam material whereby to vary the properties of the cushion by selection of the foam.

Various other and ancillary objects and advantages of the invention will become apparent from the following description and explanation of the exemplary embodiments of the cushion shown in the accompanying drawings.

Fig. 4 is a view of a portion of the apparatus by which the foam layers are formed.

Fig. 5 is an end view of the apparatus shown in Fig. 4.

Figure 1:
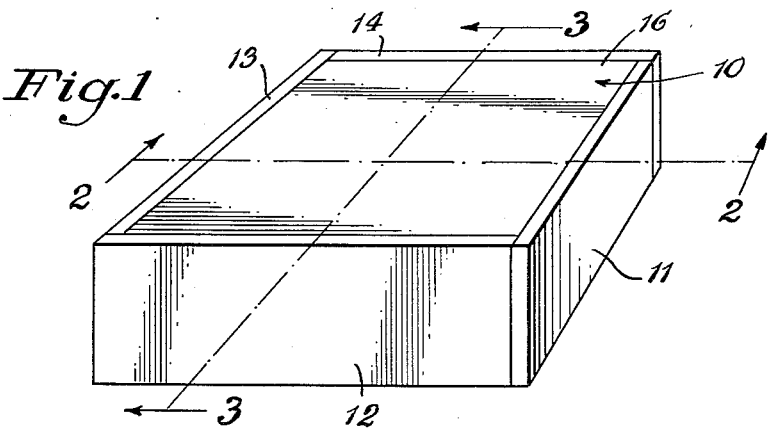
Fig. 1 is a perspective view of a preferred form of cushion of the present invention.

Fig. 1 shows a rectangular cushion in which the body portion designated 10 is of rather rigid but resilient flexible foam, such as certain kinds of polyurethane. The four banding layers 11, 12, 13 and 14 are soft, highly resilient foam rubber adhesively united to the body foam 10. The body foam 10 is highly resistant to compression whereas the banding material 11 through 14 is soft and yielding with little resistance to compression, yet highly resilient. As a result, a casing for the cushion of upholstery sheet covering may be made with a tight fit for the cushion illustrated in Fig. 1 so that the foam rubber banding is compressed at the edges to the contour of the casing and so that the resilience of the banding material tends to pull the casing tight and provide a snug fit. Were the banding material omitted, the resilience of the body foam in the case of polyurethane would not function as described for the foam rubber banding and the appearance of the covered cushion would be less attractive.

In principle, the two outer layers are so formed that one face of each has a plurality of hills opposing a plurality of hills in a face of the other layer. At least some of the pairs of opposing hills have their hilltops connected. It is also desirable to have some hills in one layer oppose hills in the other layer without being connected, and normally to have their opposing hilltops spaced apart in the uncompressed state of the cushion. Thereby, at a certain point in compressing the cushion, the spaced hilltops become mutually compressed and at that point add their resistance to compression to the resistance offered by the connected hilltops.

Preferably, the hills slope away from their hilltops so that as the cushion is compressed the resistance is resultingly increased. The connection of one hilltop to another serves to prevent lateral displacement of one layer from the other. The greater the area of the hilltops so connected, the greater is the resistance to initial compression from the uncompressed state. Accordingly, the hilltops may have rounded areas at the region of connection but they preferably have some extent of flat area. It is also preferable that the connected hilltops of each layer lie in a plane.

The hills which are connected may be directly connected one to the other, as by adhesive, or there may be an interposed material which is adhesively connected to the opposing hilltops, and the connecting material may be such as to supply additional cushioning effect.

Figure 2:
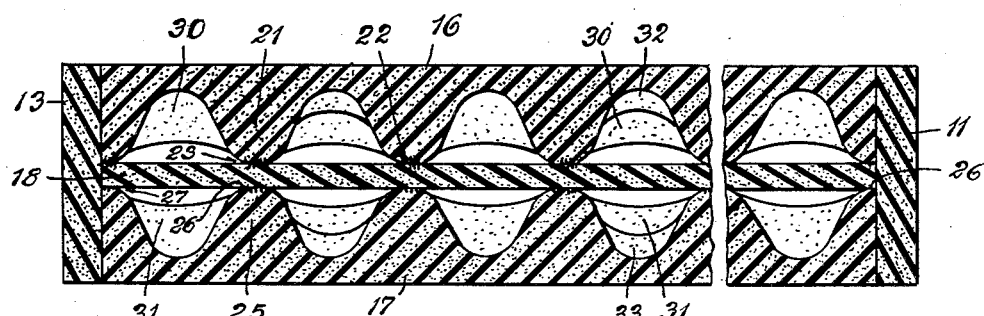
Fig. 2 is a cross-section of the cushion of Fig. 1 taken on the line 2—2 of Figs. 1 and 2.
Figure 3:
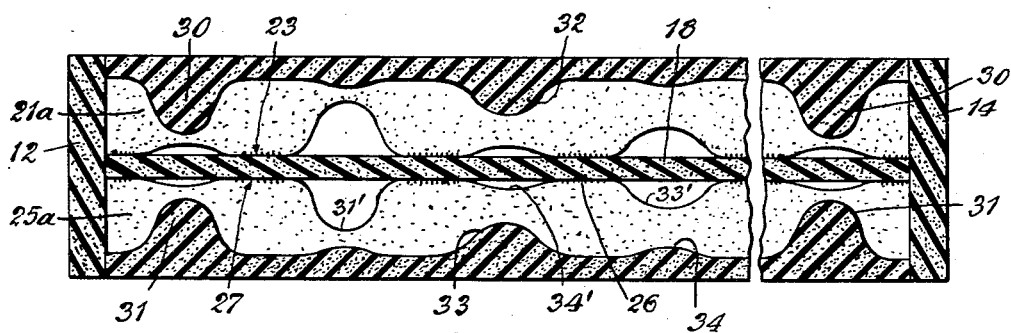
Fig. 3 is a cross-section of the cushioning of Fig. 1 taken on the line 3—3 of Fig. 1.

As shown in the drawing, the body foam 10 is made of at least two outer foam sections 16 and 17 each of relatively highly resistant resilient foam. These layers are so made that they present hills and valleys with a plurality of the hills in one layer opposing a plurality of the hills in the other layer and with some of these opposing hills connected to each other by suitable means 18. The connecting means 18 may be an interfacial layer of adhesive or it may be interposed material such as sheet material united at one face to the hilltops of one layer by adhesive and similarly united at its other face to hilltops of the other layer. As shown in Figs. 2 and 3, the connecting means 18 is a layer of resilient foam. As such, it may have the same characteristics as either one or both of the outer foam layers 16 and 17, but advantageously it may be a layer of highly resilient foam having lower resistance to compression than either of the layers 16 and 17, for example, being similar to the soft foam rubber banding material above described. Thus, the initial compression of the cushion causes the foam layer 18 to yield and exhibit initial softness of the cushion, which changes on full compression of layer 18 to the greater resistance of the foam layers 16 and 17.

As shown in Fig. 2 in cross-section, the hills and valleys in the cross-section are in a wave-form arrangement, somewhat comparable to corrugations along the face of the layer. The top layer has hills 21 (inverted in Fig. 2) with small flat top areas 22 connected by adhesive 23 to the foam layer 18. In the normal state of the cushion, the hilltops 22 are in a common plane. The lower layer 17 is similar in construction with hills 25, hilltops 26 and adhesive 27 secured to the foam layer 18. In the valleys between these hills in each layer, there are visible, in Fig. 2 crossing hills 30 and 31, respectively, in the layers 16 and 17, which crossing hills are lower in height than the hills 21 and 25, and on each side of the said hills 30 and 31 still lower crossing hills 32 and 33, respectively, in the layers 16 and 17. These crossing hills are better shown in cross-section in Fig. 3.

In Fig. 3, the cross-section is taken at the bottom of a valley illustrated in Fig. 2, and, in consequence, the slopes 21ª and 25ª of the hills 21 and 25 are visible in elevation and the lengths of the flat hilltops 22 and 26 are evident. Crosswise of the valleys in Fig. 2 and from slope to slope of the hills 21 in layer 16 are seen the first set of lower hills 30, and in layer 17ª corresponding first set of lower hills 31. In the assembly of the two layers, these lower hills 30 and 31 are opposed to each other but separated so that on compressing the cushion to a certain point, they will be mutually compressed and thereby at a second level add their resistance to the resistance arising from the connected hills 21 and 25.

Midway in the valley between the hilltops 31 in Fig. 3 there is the still lower hill 33 corresponding to a depression 33' centered in the top of the ridge of hill 25. Between each hill 31 and the next lower hill 33 is a minor rise 34 corresponding to a matching dip 34' in the said ridge of hill 25. The hills 33 are the inherent result of the hills 31 being lower than the hills 25. The rise 34 and dip 34' are incidental results of the distribution of compressive forces within the foam while being split.

The contour of the second level hills 30 and 31 in cross-section is the result of the particular manner of cutting them, later described. However, the invention is not limited to the particular contour of the crossing hills nor to said hills being lower than the hills 21 and 25. The height of the hills 30 and 31 may be readily varied to control the compressive characteristics of the cushion by changing the cutting and they may be such that the tops of the hills 30 and 31 are at the same level and continuous with the tops of the hills 21 and 25.

The two layers 16 and 17, as illustrated in Fig. 2 and Fig. 3, are the result of a single knife cut midway between the two faces of a sheet of foam while a continuously moving sheet is variously compressed from both faces over the cutting line. It is not essential to the present invention that the two layers be complementary as the result of such an operation, but it is economically desirable inasmuch as a simple mechanical operation of cutting provides from one sheet of foam two layers which together may form a cored cushion. The method of so splitting a sheet or block of foam is more fully described and claimed in my co-filed application Serial No. 591,635 in which is also disclosed the apparatus shown herewith in Figs. 4 and 5.

Because of the difficulty in graphically representing the illustrated hills and valleys of the two layers 16 and 17 in a perspective drawing and in register, the detailed character of the exemplary layers is herein disclosed by reference to the particular manner of cutting a block of foam to provide the two layers.

In splitting a block of foam to provide the structure described, a web of foam is moved continuously onto a straight slitting knife and each face of the foam is compressed at the line of cutting in such a way that the resulting cut faces yield the structure illustrated and described. A description of the compressing means is herewith given to illustrate the sequence of compressions as the foam moves past the cutting blade. The block of foam is designated 40. The cutting blade is illustrated by the numeral 41. Above and below the cutting blade and equally distant therefrom are two rotating shafts 42 and 43 having rollers fixed thereon. The rollers are all of uniform diameter and are arranged to move at the same peripheral speed as the foam which is passing the cutting blade. On the top shaft 42 there is a series of spaced rollers 44 on centers, for example, 3 inches apart. Each roller is about 4 inches in diameter and has a wide face, such as, 1¼ inch width. On the lower shaft 43, there is a like set of rollers 45 so arranged that the roller of one shaft is opposed by a space between rollers on the opposite shaft. The relative width of the rollers and of the spacing may be related to the thickness of the foam and the separation of the two sets of rollers, so that the tops of hills 21 and 25 may be rounded or flat and of variable width.

The two shafts are vertically adjustable and in such adjustment each is moved the same distance away from the line of cutting. The rollers are adjusted so as to compress a sheet of foam being split to the required degree which is variable according to the thickness and stiffness of the foam and also according to the particular structure desired. For example, in cutting a foam 4¾ inches thick, which may be suitable for a mattress, the peripheries of the rollers are spaced apart 0.45 inch. In cutting foam 2¾ inches thick, for example, suitable for seat cushions, the peripheries of the rollers are apart 0.39 inch.

With the rollers as described, but not as illustrated, a foam passing therethrough will be cut to continuous corrugations along the direction of movement, comparable to the cross-section shown in Fig. 2. However, with such a structure in a cushion made with the hilltops of the resulting layers opposed to each other, there are parallel bands of high resistance and intervening bands of low resistance to compression. To eliminate such bands, there are also provided the hills 30—31 and their valleys running crosswise of the direction of the moving web being cut.

To accomplish the crosswise hills and valleys, there are provided compressing bars 47 variously, but regularly, arranged from roller to roller on each shaft 42 and 43, and preferably a recess 48 in each roller so arranged that recesses in a roller on one shaft opposes each crossbar on rollers on the other shaft. The crossbars 47 are arranged as inserts into the peripheries of the rollers which carry them. Only as a matter of convenience the recess having a crossbar is of the same structure as a recess 48 opposing a bar, thus to permit changing the arrangement for other patterns when desired.

Fig. 5 shows an end view of the rollers and the relations of the crossbars and complementary recesses. Each roller has two bars 47 and two recesses 48 arranged in pairs diametrically of the roller, the recess in the upper rollers being opposite a bar of the lower roller, and vice versa.

As shown in Fig. 4, the two bars 47 in each roller extend in opposite directions to the adjacent rollers, thus forming, as shown in Fig. 4, a zig-zag relationship at the upper shaft. The lower shaft in Fig. 4 shows the bars 47 carried by adjacent pairs of rollers across the spaces between rollers.

With the compressing means shown in Figs. 4 and 5, the complementary layers 16 and 17 are formed so that the two layers may be fitted together as a block, and yet separated and fitted together so that hilltops in one layer are opposed by hilltops in the other layer.

By inspection of Fig. 2, it is seen that in cutting, compression of the top layer 16 of the foam by rollers 44 over the region of the valleys is resisted by the thickness of the foam backed by a gap between adjacent rollers 45 on the opposite face. In using the rollers shown, there is no portion of the block being cut which is compressed equally from both faces, in part because the rollers are staggered, and in part because where a crossbar is opposed by a roller on the opposite shaft, the roller is recessed. By not having these recesses, the foam being cut will be equally compressed from both faces toward the cutting blade, and the cut will be centered at the median plane of the foam being cut. By making the roller recesses deeper and peripherally wider so that the surface of the recess does not compress the foam, the bars will function like the unopposed peripheries of the rollers and thus form crossing hills 30 (or 31) as hills connecting adjacent hills 21 (or 25). Thus, by varying the effective depth of the recesses 48 from none at all to a non-compressing depth, the location of the top of the cross hills 30 and 31 may be varied from the midplane of the foam being cut to the level of the hills 21 and 25.

It is preferred to provide two layers with a contoured face by splitting a sheet as described. Nevertheless, the same advantages in cushioning may be obtained by originally molding the foam wtih a contoured face, and such layers singly, and combined at their contoured faces, are contemplated by the present invention.

Although the invention has been more particularly explained by reference to a cushion having two flat faces as a result of joining two contoured faces of the resilient foam, it is to be understood that one of the described layers, especially when placed with its contoured face on a flat base, provides a suitable cushion by reason of its contoured face. Such a single layer is also comprehended along with other modifications within the scope of the invention as set forth in the appended claims.

I claim:

1. A laminated upholstery cushion comprising at least two layers of resilient foam, said layers having faces opposing each other, said faces being contoured and presenting hills and valleys, hilltops of one layer being connected to hilltops of the other layer, means connecting the two layers together at said hilltops, at least one layer having in said valleys additional hills with hilltops located with a space above them in the uncompressed state of the cushion, and of such height that in compressing the cushion said additional hills are compressed, thereby increasing the resistance of the cushion to further compression.

2. The product of claim 1 in which both of said layers have said additional hills.

3. A sheet of resilient foam material having a contoured face comprising a first series of parallel hills and valleys with hilltops in a plane bounding said face and other hills located in said valleys with hilltops below said plane.

4. A sheet of resilient foam material having a contoured face comprising a first series of parallel hills and valleys with hilltops in a plane bounding said face and a second series of parallel hills and valleys crossing the first series and with hilltops below said plane.

5. A sheet of resilient foam material having a contoured face comprising a first series of parallel hills and valleys with hilltops in a plane bounding said face and a second series of parallel hills and valleys crossing the first series at right angles and with hilltops below said plane.

6. A sheet of resilient foam material having a contoured face comprising a series of parallel hills and valleys with the hills topping in a plane bounding said face, and in said valleys additional hills having their tops inwardly from said plane.

7. A sheet of resilient foam material having a contoured face comprising a first series of parallel hills and valleys and a second series of parallel hills and valleys crossing the first series, the hills of the first series topping in a first plane bounding said face, and the hills of the second series having their tops lying in a second plane inwardly from and parallel to said first plane.

8. A laminated upholstery cushion comprising at least two layers of resilient foam, said layers having faces opposing each other, said faces being contoured and presenting hills and valleys, hilltops of one layer being connected to hilltops of the other layer, means connecting the two layers together at the hilltops, said top layers of foam having higher resistances to compression relative to the hereinafter-mentioned resistance, and banding material from face to face of the cushion adhesively united to the peripheral side edges of the cushion, said banding material being in sheet-form and having relatively lower resistance to compression, whereby a casing of upholstery-covering sheet material may be formed to compress the banding material in tightly fitting the casing on the cushion in a manner to compress and round the corners of the banding material.

References Cited in the file of this patent

UNITED STATES PATENTS 2,619,659     Futterknecht     Dec. 2, 1952

FOREIGN PATENTS 376,937     Great Britain     July 21, 1932
389,833     Great Britain     Mar. 20, 1933

UNITED STATES PATENT OFFICE

CERTIFICATE OF CORRECTION

Patent No. 2,836,228                                                 May 27, 1958

Donald E. Dahle

It is hereby certified that error appears in the printed specification of the above numbered patent requiring correction and that the said Letters Patent should read as corrected below.

Column 6, line 31, for "said top layers" read -- said two layers --.

Signed and sealed this 27th day of September 1960.

(SEAL)
Attest:

KARL H. AXLINE                                               ROBERT C. WATSON
Attesting Officer                                           Commissioner of Patents